United States Patent
Cox et al.

[11] Patent Number: 5,363,305
[45] Date of Patent: Nov. 8, 1994

[54] NAVIGATION SYSTEM FOR A MOBILE ROBOT

[75] Inventors: Ingemar Cox, Lawrenceville, N.J.; John J. Leonard, Boston, Mass.; Hugh Durrant-Whyte, Oxford, England

[73] Assignee: NEC Research Institute, Inc., Princeton, N.J.

[21] Appl. No.: 843,570

[22] Filed: Feb. 28, 1992

Related U.S. Application Data

[63] Continuation-in-part of Ser. No. 547,768, Jul. 2, 1990, abandoned.

[51] Int. Cl.⁵ .................. G06F 15/00; G01C 3/00
[52] U.S. Cl. .................. 364/443; 364/424.02; 395/88; 395/93; 901/1
[58] Field of Search .......... 364/443, 424.02; 395/88, 93; 901/1

[56] References Cited

U.S. PATENT DOCUMENTS

| | | | |
|---|---|---|---|
| 4,584,646 | 4/1986 | Chan et al. | 364/443 |
| 4,773,018 | 9/1988 | Lundström | 364/443 |
| 4,809,191 | 2/1989 | Domeier et al. | 395/93 |
| 4,815,840 | 3/1989 | Benayad-Cherif et al. | 364/443 |
| 4,817,000 | 3/1989 | Eberhardt | 364/443 |
| 4,821,206 | 4/1989 | Arora | 395/93 |
| 4,847,773 | 7/1989 | Van Helsdingen et al. | 364/443 |
| 4,940,925 | 7/1990 | Wand et al. | 395/93 |
| 4,951,213 | 8/1990 | Baxter et al. | 364/443 |
| 5,052,799 | 10/1991 | Sasser et al. | 364/443 |
| 5,087,916 | 2/1992 | Metzdorff et al. | 364/443 |

OTHER PUBLICATIONS

Durieu et al., "Localization of a Robot with Becons Taking Erroneous Data into Account", and Automation, 14–19 May 1989.

Primary Examiner—Gopal C. Ray
Assistant Examiner—George Davis
Attorney, Agent, or Firm—Arthur J. Torsiglieri; Philip J. Feig

[57] ABSTRACT

A navigation system for a mobile autonomous robot that includes apparatus for creating and maintaining a map of an environment the mobile autonomous robot is to traverse including provision for storing in a map at an assigned location features representative of geometric beacons located in the environment. Because of the uncertainty in its sensor's operating conditions and changes in the environment, a credibility measure is associated with each map feature stored. This credibility measure is increased or decreased whenever the map feature assigned to a location matches or does not match, respectively, a geometric beacon corresponding to such location. Whenever a geometric beacon is observed for a location that does into match a previously stored map features, an appropriate map feature is added for such location.

7 Claims, 4 Drawing Sheets

```
for(all predicted and observed points)
{
    if observed = predicted
    {
        then increase confidence in model
    }
    else if predicted is not observed
    {
        then decrease confidence in predicted feature
        (model)
    }
    else if observed is not predicted
    {
        then insert new feature and begin
        increasing confidence
    }
}
```

FIG. 5

NAVIGATION SYSTEM FOR A MOBILE ROBOT

This is a continuation-in-part of application Ser. No. 07/547,768 filed Jul. 2, 1990, now abandoned.

FIELD OF INVENTION

This invention relates to a navigation system for a mobile robot vehicle and, more particularly, to such a navigation system which includes apparatus for dynamically building and maintaining a map of the environment the robot is to traverse to facilitate its navigation within such an environment. In another aspect, the invention may be viewed as a method of controlling the navigation of a mobile robot within a limited environment.

BACKGROUND OF THE INVENTION

Navigation is a fundamental requirement for the successful use of a mobile robot. Navigation is of particular interest when the mobile robot is to be "autonomous" where "autonomous" describes the ability of the robot, once actuated, to navigate without human intervention and without dependence on artificial, either active or passive, beacons placed in its environment.

For successful navigation, an autonomous mobile robot generally will need a navigation system that includes a map of its environment. Various arrangements are known in which the robot is provided with an accurate map of its environment at the start of its travel and the environment is assumed to remain fixed during its travel. However for most autonomous robots, it is desirable to build and maintain a map of the robot's environment automatically. Moreover, even when a robot is provided with a map of its environment, it would be desirable to update automatically the map when the environment changes.

Typically, an autonomous robot determines its relationship to its environment by scanning. As used herein, scanning denotes the process of obtaining electronic signals and converting these signals into digital form from one or more active or passive sensors mounted on the robot. The process may or may not involve a physical rotation or movement of the sensors. A sensor is active if the sensory data is obtained through a process in which energy is radiated from the sensor to be reflected from a reflecting surface in the environment back to the sensor for detection. A sensor is passive if it merely detects ambient energy reflected from a reflecting object in the environment such as a camera tube. The energy involved in scanning may be ultrasonic or electromagnetic such as microwave infra-red and visible, and systems are readily available for use with any of these types. A common difficulty is in interpreting the sensed data and deciding what the sensed signals tell about the environment.

There are two distinctly different problems associated with sensing, distinguishing useful data from noise and uncertainty in the origin of the sensor measurements available.

The noise problem is usually handled by conventional techniques, such as the Kalman filter, the corresponding uncertainty due to noise usually being represented by a covariance matrix. The uncertainty in the origin of the measurements or data association problem typically has been largely ignored in the past though sometimes merged with the measurement noise. However, covariance matrices cannot represent the data association uncertainty.

We shall refer to the process of determining a robot's position as the process of localization.

This is a process of looking for and tracking expected and defined events. However, in most practical systems, there are occurrences that are unexpected and not well defined. Building maps of an environment for sensor information should involve maintaining a coherent map of expected events while evaluating and incorporation new, unexpected events as needed.

In two papers "entitled" Navigation by Correlating Geometric Sensor Data," authored by Hugh F. Durrant-Whyte and John J. Leonard, Proc. IEEE RSJ International Workshop on Intelligent Robots and Systems, (1989) Sep. 4–6, Tsukuba Japan, pp 440–447 and "Mobile Robot Localization" authored by J. J. Leonard and H. F. Durrant-Whyte, IEEE Transactions on Robotics and Automation, Vol 7 #3, (1991), there is described an autonomous mobile robot that utilizes a navigation system that reliably extracts geometric beacons from sensor data and utilizes them in automating a navigation system. The navigation algorithm of this system is based around a simple Kalman filter that is employed to estimate the position of the vehicle. The present invention basically involves improvements in a navigation system of the kind described in this paper and reference is made to such paper for background.

BRIEF SUMMARY OF THE INVENTION

In accordance with the invention, there is included for use by an autonomous mobile robot a navigation system that includes a map of the environment which the robot is to traverse, and this map is dynamically maintained by a novel navigation process that allows operation in a dynamic environment. A dynamic environment is characterized by unexpected changes in the reflecting objects that serve, as geometric beacons in the environment. A geometric beacon is a special class of target that can be reliably observed in successive sensor measurements and that can be accurately described in terms of a concise geometric parameterization. Typical geometric beacons include room walls and the corners between room walls. A geometric beacon can also be provided by a reflecting element suitably designed and positioned to be reliably observed and may even be a moving object of its motion can be modelled accurately. In particular, the navigation process is based around an extended Kalman filter approach that utilizes matches between observed beacons that serve as targets and a given or earlier developed map or list in which beacon locations are stored to provide a reliable estimate of the robot position. An important element of the extension in approach is the attachment of a measure of credibility or (credibility value) to each feature in the map that is independent of the covariance matrix that represents the associated spatial uncertainty.

In particular, tile Kalman filtering steps of prediction, observation and matching proceed in conventional fashion and matching is used now to yield three different sets of data, matched predictions and observations, unobserved predictions, and unpredicted observations. In the earlier system, only successful matches would be processed and the rest rejected. In our novel system, estimation is performed using only matched predictions and observations that correspond to targets in the map with a high credibility measure. Additionally, the new system utilizes a map update step in which matched targets together with unexpected observations and unobserved predictions are all sent to an explanation stage that decides on how best to update the map. This updating may consist of adding additional features, deleting existing features, and/or increasing or decreasing the credibility of existing features in the map. Basically, our novel approach involves developing a map of the environment in which are stored features that are expected to be static or at least predictable in position and each of which has an associated spatial uncertainty represented by a covariance matrix and an associated credibility value, possibly represented as a value between the 0 and 1. The credibility of a feature is increased each time an associated beacon is both predicted and sensed/observed. Beacons that are predicted but not sensed have the credibilities of their map features decreased. Locations of beacons sensed but not predicted and so unexpected, are inserted new features into the map, initially with a low credibility value. These inserted features increase in credibility if subsequent predictions are supported by sensing.

In an illustrative embodiment to be described in more detail, the navigation system that is provided on the robot includes: apparatus for radiating ultrasonic pulses from the robot for incidence on and reflection from reflecting elements in the environment that the robot is to traverse; apparatus for receiving the reflected pulses and from such pulses extracting sensory data descriptive of the location of characteristic geometric beacons within the environment; apparatus for using such sensory data to form a map of the environment that includes as features the location of geometric beacons detected from such sensory data and to maintain credibility values for each feature of the map by our novel process as the robot makes successive traversals of the environment.

BRIEF DESCRIPTION OF THE DRAWINGS

The invention will be better understood from the following more detailed description taken in conjunction with the accompanying drawing in which:

FIG. 5 describes the operations performed by the map-building and maintenance subsystem 60 shown in FIG. 4.

DETAILED DESCRIPTION OF THE INVENTION

Figure 1:
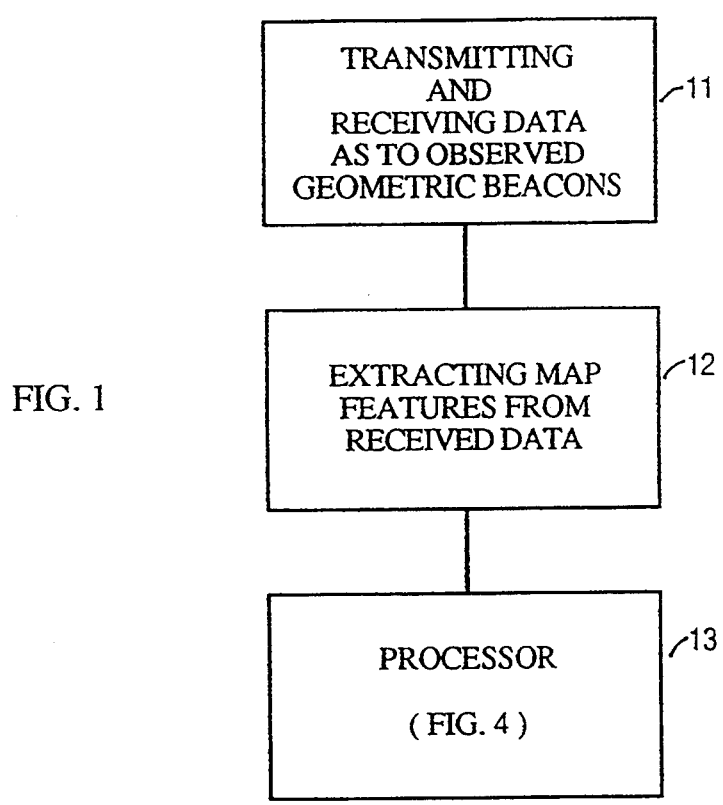
FIG. 1 shows in block schematic form the basic elements of a navigation system in accordance with the present invention.

With the reference now to FIG. 1 of the drawing, the navigation control system 10 designed to be positioned within the robot first includes as its basic components apparatus 11 for transmitting and receiving signal pulses, typically ultrasonic, that are used to acquire the sensory data that will be used to sense the presence or absence of geometric beacons within the environment that the robot traverses. Suitable apparatus for such purpose is well known to workers in the robot navigation art and so will not be described in detail here. The system 10 further includes apparatus 12 for extracting useful data from the sensory data provided by apparatus 11, such useful data being information as to the location of geometric beacons observed in the robot's traversal of the environment. As is also known to workers in the art, this apparatus basically can be of the type described in the paper previously identified in the background of the Invention. Finally, the system 10 comprises a processor 13 that is supplied with the extracted beacon data to establish and maintain features in a storage medium. This serves as a map of the environment in which are included the location as map features beacons detected in the robot's traversal of the environment. Moreover each such map features includes a credibility value, whereby in determining its position in the environment the robot may rely selectively on those map features of higher credibility values. The processor 13 will be discussed in more detail subsequently in connection with FIG. 4.

Before describing in detail the novel features that characterize the present invention, it will be helpful to discuss the problem of localization of the robot's position.

Figure 2:
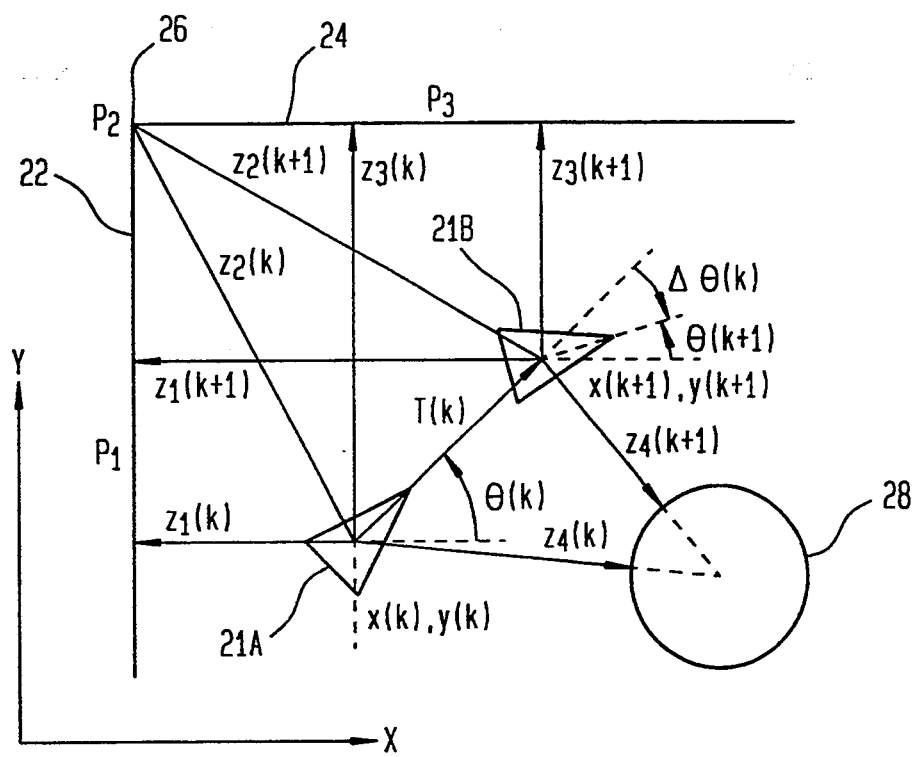
FIG. 2 illustrates localization by tracking geometric beacons in which the vector $x(k)=[x(k), y(k), \theta(k)]$ is the robot's position and orientation at time k, described in the earlier paper mentioned above, and also in detail in Appendix A.

FIG. 2 illustrates the localization of position by tracking geometric beacons. For simplicity, we have considered only location in two dimensions, but extension to three dimensions is straightforward. In this arrangement, four geometric beacons or targets are in view to an ultrasonic sensor that is housed in a mobile robot that is represented at a time step k by the triangle 21A and at a later time step (k+1) by the triangle 21B. The four geometric beacons include planes 22 and 24 formed by a pair of walls, the corner 26 formed between such two walls, and a cylinder 28.

The position and orientation of the robot at time step k can be represented by the state vector $x(k)=[x(k),y(k),\theta(k)]$ comprising a Cartesian location x,y and a heading $\theta$ defined with respect to a global coordinate frame.

At initialization the robot starts at a known location and in this case, the robot is assured to have an initial map of the locations of the geometric beacons. At each time step, observations of these beacons are taken, and the cyclical process is used to associate measurements $z_j(k)$ with the correct beacons to compute an updated estimate of the robot position. A detailed analysis of the localization technique is set forth in Appendix A.

However, in most practical situations, the localization process in Appendix A will occasionally predict observations which are not supported by measurements as when one or more of the beacons is obscured by an intervening obstacle. Similarly, occasionally this process will record sensor measurements that are not previously predicted, such as when the sensor observes measurements from a new beacon. For these reasons, in typical situations, it is a important to be able periodically to update the map of the environment to be used by the robot.

A feature of the invention is the continuous updating of the map to be used by the robot.

The building and maintaining of maps can be broadly considered a problem in machine learning, an area of research which has received a tremendous amount of interest. Broadly, learning can be divided into supervised and unsupervised learning. Supervised learning assumes that an initial training set of correctly-labeled examples is available. This is not true for the autonomous vehicle which must therefore learn its environment by some unsupervised means. Traditionally, unsupervised learning takes the form of a cluster analysis problem arranging features into clusters or classes based on a numerical measure of feature similarly. In our case, the features are geometric beacons. Clustering of the geometric beacons in space is unnecessary since the Kalman filter and validation gate methodologies have already determined which features correspond with each other.

Previous theoretical work on robot learning of an environment includes a paper entitled "Sensor-based terrain acquisition" a "seed spreader strategy," published in IEEE/RSJ Int. Workshop on Intelligent Robots and Systems, pp. 62–67, 1989 by V. Lumelsky and a paper entitled "Anew approach to unsupervised learning in deterministic environments" published in FOCS, 1989 by Rivest and Schapire. The first is concerned with determining a path of the robot, the traversing of which would guarantee that the entire environment is viewed. Navigation is not an issue here, but rather, the development of a sensing strategy for "terrain acquisition." Rivest and Schapire examined the problem of unsupervised learning for a deterministic environment. Again navigation is not an issue here, but rather, the development of at sensing strategy for the problem of unsupervised learning for deterministic environments. However, dynamic environments are non-deterministic.

Figure 3:
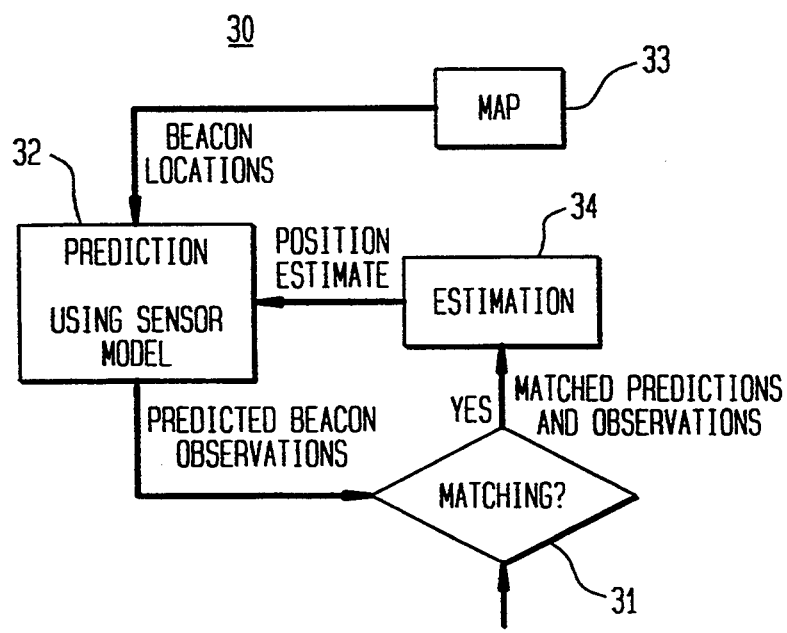
FIG. 3 is a block diagram illustrating means for localization using an existing map which remains fixed, as described in such earlier paper and in Appendix A.
Figure 4:
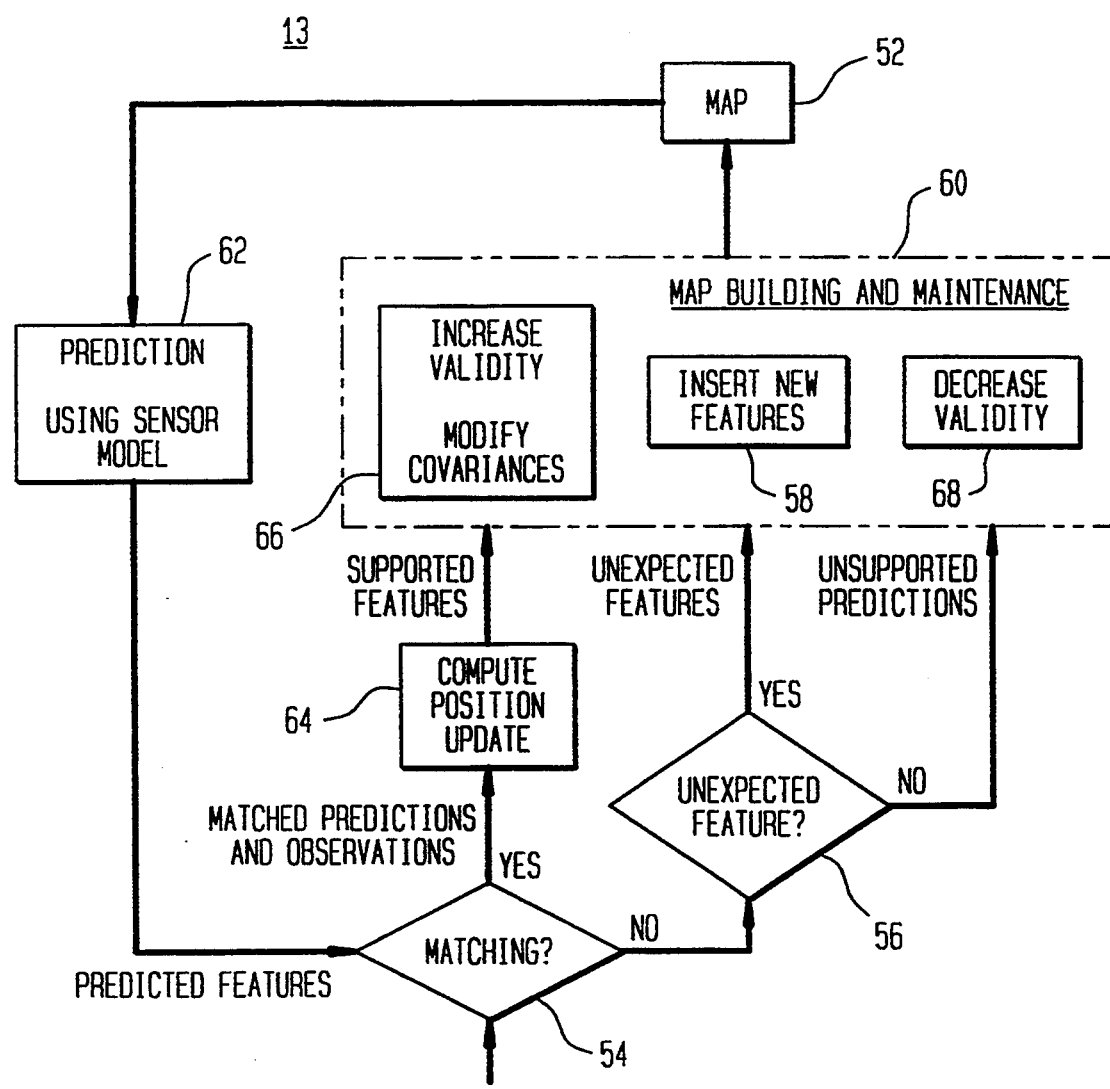
FIG. 4 is a block diagram illustrating means for localization in accordance with the present invention incorporating map building and updating.

Each of FIGS. 3 and 4 may be viewed alternatively either as a flow diagram of the basic steps of a process for performing these learning functions and providing a map for navigation of the robot or as a block diagram of a processor for carrying out the basic steps of the navigation process. In this regard, FIG. 3 may be viewed as illustrative of either a previously known process or processor for the navigation while FIG. 4 may be viewed similarly. In practice, the processor typically would be an appropriately programmed microprocessor or a special purpose computer.

However for purposes of simplification, hereinafter the discussion will treat these figures as block diagrams of the components that perform the identified steps or functions in the processor.

With reference first to FIG. 3 which illustrates a processor 30 suitable for carrying out the basic steps of matching an observed beacon with a feature already in an a priori map. In this situation, information as to an observed beacon is supplied as the input to the matching means 31 to which is also supplied information from the prediction means 32 which predicts whether a beacon is to be observed at such location by sensing for a feature with such location in the storage medium or map 33. If the matching means 31 establishes a match between the observed beacon and the stored feature, this beacon is used by the estimation means 34 to estimate the position of the robot at the time the beacon was observed. This position information is also supplied to the predictor means 32 for use in locating from the map 33 the expected beacon to be matched next.

As mentioned above, the present invention utilizes a new process that has additional characteristics to better adapt the robot for navigating a dynamic environment in which the environment is subject to change and so its map requires regular updating. In particular, in a dynamic environment it may become necessary to add or subtract features in the map to reflect additions or deletions of observed reflecting elements in the environment. The functions to be performed by the processor 50 shown in FIG. 4 to do such updating. In particular, the process incorporates both map-building and map maintenance or updating. In addition, the process adds the concept of associating with each map feature a credibility value or weight that is variable so that it can be increased or decreased as the circumstances warrant.

By incorporation of a map-building phase, initialization no longer requires an a priori map, although if described initial target locations may be provided, if readily available. In this way, the process accommodates any level or prior information, ranging from none to complete. The Kalman filtering steps of prediction, observation and matching proceed as before.

However, in the novel process, matching is used to yield three separate sets of information current observations that match predictions based on previously map stored features; predictions from previously stored map features that are not matched in current observations, and finally current observations that are not matched with predictions from previously stored map features.

In addition, the novel process adds the concept of providing a weight or credibility value to each map feature. This credibility value for a given feature is increased in a prescribed manner each time a beacon is observed for its location but decreased in a prescribed manner each time a beacon is not observed for the location. Moreover, each map feature when first stored is assigned an initial weight or credibility value which is increased or decreased as the result of subsequent observance or non-observance of a corresponding beacon.

Advantageously, the map comprises a semiconductive memory, such as an electronically programmable and electronically erasable memory, in which is stored a list of the map features in the form of the coordinates of the observed beacons together with a corresponding credibility value. As new beacons are observed, their coordinates are stored in tile list with an initial credibility value and, in each subsequent scanning of the environment such credibility value is increased if a beacon is observed at the coordinates stored and decreased if a beacon is not observed at tile coordinates stored.

Estimation is now performed, using selectively only matched predictions and observations needed which correspond to targets in the map which have a high, or highest, credibility measure. In this way, we only use the data we have the most confidence in to compute an accurate position estimate. Updates from just a few beacons can quickly provide an accurate, reliable position estimate.

The primary modification to the processor is the addition of a Map Update function. Matched features, together with unexpected observations and unsupported predictions, are all then sent to an explanation phase which must decide on how best to update the model. The set of actions consists of inserting additional features, deleting existing features and increasing or decreasing the credibility of existing features in the navigation map.

The problem of updating the navigation map can be formulated as: Given sets of Predicted P and sensed S features and the intersection of the two sets $P \cap S$, i.e. those features that were both predicted and sensed, how can we build and maintain a model of our environment? There are two error terms: the number of unsupported predictions, $\| P - P \cap S \|$; and the number of unexpected measurements, $\| S - P \cap A \|$. We should forget unsupported predictions and learn unexpected events, provided they persist in time. More precisely, belief in a prediction that is frequently unsupported should be reduced each time until forgotten: belief in an unexpected event should be increased if subsequent predictions of the event are regularly supported by measurements. Intuitively, in a highly dynamic environment in which there are many unmodeled, moving objects there will be many temporarily unsupported predictions and many transient unexpected events. Conversely, in an almost static environment in which there is very little change, we will have few unsupported predictions and few unexpected measurements. One might expect that the rate of change of belief with respect to errors will be slower in the former case, faster in the latter case. However, if all errors are due to transient objects moving through the environment, e.g. people, we should update our belief at the same rate, the relative frequency of occurrence of these transient objects is not relevant. If, on the other hand, changes in the (almost) static environment usually represent more permanent change., e.g. the moving furniture, than the rate of changes of belief should be increased. Of course, there may be instances where this intuitive model for updating may be inappropriate.

This updating can take a variety of functional forms. A probabilistic Bayesian approach is possible but difficult. Instead, we chose to increase our belief in a feature based on the number of times it is supported and decrease our belief based on the number of times it is unsupported. Obviously, the asymptotic values for the belief are 0 and 1. Given a model containing at set of features, (fi), then if $n_s$ is the number of supported sightings of $f_i$ and $n_u$ is the number of unsupported predictions of $f_i$ and $p(f_i)$ is the credibility of feature $f_i$, then it seems reasonable to assume an update functions of the form:

$$p(fi) = max(0, 1 - e^{-(ns/\alpha - nu/\beta)})$$

or $$p(fi) = max(0, 1 - e^{-(ns^2/\alpha^2 - nu^2/\beta^2)})$$

The arbitrary coefficients, $\alpha$ and $\beta$ are dependent on the sensor and environmental operating conditions. If $\alpha$ and $\beta$ are equal then we learn at the same rate we forget. However, it may be advantageous to have different rates for increasing and decreasing the belief in a feature. In particular, localization accuracy is unaffected by the number of unsupported predictions, they simply increase the time of the verification stages. FIG. 5 summarizes the proposed process.

Initially, it will be helpful to discuss the invention involving the navigation system of FIG. 4 with respect to the situation in which the robot has no map a priori. The algorithm remains the same. The only difference is that there are no map features already in existence to provide predicted features, so none are assumed.

To this end, the robot is introduced into the environment in which it is to navigate and the process activated. Its initial position serves as the origin of the coordinate system, typically two-dimensional, but possibly three-dimensional, of the map. As in the previously discussed system, the transmit and receiving apparatus of the navigation system provides the initial sensory data from observed geometric beacons along its path and the Kalman filter serves to extract from such sensory data information as to the location of observed beacons for storage as features in the map.

The information serves as the input data to processor 50 shown in FIG. 4. This input data is normally compared with values of predicted features derived from features previously stored in map 52, which typically is an electrically programmable and erasable semiconductor memory. However, since at this time, the map is empty there are no features stored therein to be supplied to the matching means 54. Similarly, when this information is supplied to the means 56 designed to decide which such feature is unexpected, again because of no previous history, this information will be viewed as unexpected and so will trigger the feature insertion means 58 of the map building and maintenance subsystem 60 to enter such feature at an appropriate address in the memory that serves as the map 52.

The robot then moves along, making periodic scans of the environment. In a simple application, the robot's path might be programmed in advance with only moderate freedom to depart from its programmed path to avoid obstacles. In a more sophisticated application, the robot would be permitted considerable freedom to adjust its path, the better to serve its intended function.

At each subsequent sensing scan (K+1), it repeats its scanning operation, develops new sensor data and extracts the basic feature information in the data and supplies this to matching circuit 54. In this case, there are available features in the map 52 which can be used to predict observations to the matching means 54. However, before being applied to the matching means 54, the feature signals from map 52 are passed through the prediction means 62 which advantageously adjusts the map features appropriately to compensate for the different position and orientation of these features, when viewed from the robot position corresponding to time (K+1).

Accordingly, the matching circuit 54 should recognize a match between at least some of the information extracted from the new sensor data and the features provided by the prediction circuit 62 and may also find some information as to unexpected observation. The latter will be added to the map 52 by means of the insert-new-features means 58 which the former will be used, after any necessary position updating by the compute-position-update means 64 to modify the map 52 and increase the credibility weight of that data in the map by way of an increase-validity means 66 of the subsystem 60. Additionally, if the match indicates the absence of features expected to be found in the match because of data previously stored in the map, such unsupported predictions arc used to decrease the credibility measure of such features in the map 52 by means of the decrease-validity-means 68 of the subsystem 60. By the time the sensor processor has completed these operations, the robot has advanced the amount associated with a time interval step in the programmed direction, and the process of observing beacons that serve as features, matching features with predicted features, and appropriately modifying the map to increase the credibility of expected features corresponding to beacons that are observed and to reduce the credibility of expected features that are not observed, and to add new features freshly observed but not predicted, proceeds as previously discussed. Eventually, the robot completes its traversal of its limited environment.

On subsequent traversals the sensed data is matched with the predictions provided by the features stored in the map and this map is continually being updated as necessary to accommodate differences between the observed features and the predicted features, due to changes in the environment.

Soon, the map will be well established with features of high credibility based on regular matching with observed features. Normally the location estimation will be based on the use of these features. In the absence of such features, estimation will be based on other available features observed of lesser credibility. Any of various arrangements can be used to effect this selectivity.

It should be apparent that various modifications can be made in the particular system described for performing the novel process without departing from the spirit and scope of the present invention. For example, in some instances it may be desirable to supplement the inherent features in the environment with artificial elements for use as the geometric beacons so that the mobile robot is not entirely "autonomous", as previously defined.

Additionally, it can be appreciated that the invention may be viewed as a method of controlling the navigation of a robot that involves the various steps performed by the system 10, shown in FIG. 1 and constructed to include the processor 50 shown in FIG. 4.

APPENDIX A

The Kalman filter relies on two models: a plant model and a measurement model. The plant model describes how the vehicle's position x(k) changes with time in response to a control input u(k) and a noise disturbance v(k)

$$x(k+1) = F(x(k), u(k)) + v(k)$$

$$v(k) \sim N(O, Q(k))$$

where $F(x(k), u(k))0$ is the (non-linear) state transition function. We use the notation $v(k) N(O,Q(k))$ to indicate that this noise source is assumed to be zero mean gaussian with variance $Q(k)$ in the manner discussed in a book entitled "Applied Optimal Estimation", MIT Press (1973) by A. C. Gelb.

The measurement model expresses a sensor observation in terms of the vehicle position and the geometry of the beacon being observed, and has the form:

$$z_j(k) = h_i(p_i, x(k)) + w_j(k)$$

$$w(k) \sim N(O, R(k))$$

The observation function $h_i(p_i, x(k))$ expresses an observed measurement $z_j(k)$ as a function of the vehicle location $x(k)$ and beacon location $p_i$. This observation is assumed corrupted by a zero-mean, gaussian noise disturbance $w_j(k)$ with variance $R(k)$. The form of the observation function $h_i(.,.)$ depends on the sensor employed and the type of beacon being observed. Functions for a sonar sensor observing corner, plane, and cylinder targets are in accordance with the techniques described in a paper entitled "Physically based simulation model for acoustic sonar robot navigation" IEEE Trans on Pattern Analysis and Machine Intelligence, PAMI-9(6), pp. 766-778, November 1987 by R. Kuc and M. W. Siegel, Their work describes a physically-based model of sonar which considers the responses of corners, walls and edges in a specular environment. We use a high sampling density to obtain a scan that is composed of sequences of headings at which the range value measured is essentially constant. We refer to such sequences as Regions of Constant Depth.

The goal of the periodic computation is to produce an estimate of the location of the robot $x(k+1|k+1)$ where the term $x(i|j)$ should be read as the estimate of the vector x at time step i given all observations up to time step j at time step k+1 based on the estimate of the location at time step i, the control input u(i) and the new beacon observation $z_j$.

The algorithm employs the following steps: prediction, observation, matching, and estimation. FIG. 2 presents an overview of this cyclic process. We state the Kalman filter equations without derivation, but they are described in detail in a book entitled "Tracking and Data Association", Academic Press (1988) by U. Bar-Shalom and F. E. Fortmann,

Prediction

First, using the plant model and a knowledge of the control input u(k), we predict the robot's new location at time step k+1:

$$\bar{x}(k+1|k) = F(\bar{x}(k|k), u(k)) \qquad (3)$$

We next compute $P(k+1|k)$, the variance associated with this prediction:

$$P(k+1|k) = \Delta F P(k|k) \Delta F^T + Q(k) \qquad (4)$$

where $\Delta F$ is the Jacobian of $F(.,.)$ obtained by linearizing about the updated state estimate $x(k|k)$. Next, we use this predicted robot location to generate predicted observations of each geometric beacon $p_i$:

$$\bar{z}_i(k+1) = h_i(p_i, \bar{x}(k+1|k)), \; i=1, \ldots, N_k \qquad (5)$$

Observation

The next step is to actually take a number of observations $z_j(k+1)$ of these different beacons, and compare these with our predicted observations. The difference between a predicted beacon location $z_i(k+1)$ and an observation is written as $$\begin{aligned} v_{ij}(k+1) &= [z_j(k+1) - z_i(k+1)] \\ &= [z_j(k+1) - h_i(p_i, x(k+1|k))] \end{aligned} \qquad (6)$$

The vector $v_{ij}(k+1)$ is termed the innovation. The innovation covariance can be found by linearizing Equation 2 about the prediction, squaring, and taking expectations as $$\begin{aligned} S_{ij}(k+1) &= E[v_{ij}(k+1)v_{ij}^T(k+1)] \\ &= \nabla h_i P(k+1|k) \nabla h_i^T + R_i(k+1) \end{aligned} \qquad (7)$$

where the Jacobian $\Delta h_i$ is evaluated at $x(k+1|k)$ and $p_i$.

Matching

Around each predicted measurement, we set up a validation gate in which we are prepared to accept beacon observations:

$$v_{ij}(k+1) S_{ij}^{-1}(k+1) v_{ij}^T(k+1) = q_{ij} \qquad (8)$$

This equation is used to test each sensor observation $z_j(k+1)$ for membership in the validation gate for each predicted measurement. When a single observation falls in a validation gate, we get a successful match. Measurements which do not fall in any validation gate are simply ignored for localization. More complex data association scenarios can arise when a measurement falls in two validation regions, or when two or more measurements fall in a single validation region. At this stage, such measurements are simply ignored by the algorithm, as outlier rejection is vital for successful localization.

Estimation

The final step is to use successfully matched predictions and observations to compute $\bar{x}(k+1|k+1)$, the updated vehicle location estimate. We utilize the standard result that the Kalman gain matrix associated with each successful match can be written as $$W_{ij}(k+1) = P(k+1|k)\Delta h_i^T S_{ij}^{-1}(k+1), \quad (9)$$

Using all successfully matched prediction-observation pairs, we find the optimal (minimum variance) linear estimate for the state as $$\bar{x}(k+1|k+1) = \bar{x}(k+1|k) + \sum_j W_{ij}(k+1)v_{ij}(k+1) \quad (10)$$

with variance $$P(k+1|k+1) = P(k+1|k) - \sum_j W_{ij}(k+1)S_{ij}(k+1)W_{ij}^T(k+1). \quad (11)$$

Equation 10 states that the estimated location is a linear weighted sum of the predicted location, and the difference between expected and matched observed beacon locations. The weighting depends on our relative confidence in prediction $P(k+1|k)$ and innovations $S_j(k+1)$.

Note that this algorithm facilitates a directed sensing approach, in which we can use our expectations of where useful beacon information can be observed to control the sensors of the mobile robot to only "look" in these locations. By knowing where to "look", the speed and reliability of the sensing process can be greatly enhanced.

We claim:

1. A navigation system to be carried on a mobile robot that is to traverse an environment that includes geometric beacons comprising, means for scanning the environment for detecting reflections from geometric beacons in the environment and from said detected reflections extracting information as to the location of observed geometric beacons, means responsive to the information extracted from the detected reflections for storing in storing means the location of said geometric beacons as features in a map with an initial credibility value, unless already stored in the storing means, means for matching the location of geometric beacons extracted from said reflections information with map features in said storing means, means for increasing the credibility value of a map feature in the storing means each time said feature is found to match the location of an observed geometric beacon as the robot traverses the environment, means for decreasing the credibility value of a map feature in the storing means when no beacon is observed by the scanning means at the corresponding location as the robot traverses the location where such geometric beacon should have been observed, and means for computing the position of the robot that includes selecting for the computation the needed data from those geometric beacons then being observed that match the map features having relatively high credibility values.

2. The navigation system of claim 1 in which the means for scanning comprises means for radiating ultrasonic energy for reflection by geometric beacons for subsequent detection by the means for scanning.

3. The navigation system of claim 2 in which the means for extracting from the detected reflections information as to the location of the geometric beacons is Kalman filter means.

4. The navigation system of claim 1 in which the means serving as a map includes a semiconductive memory in which are stored as a map feature the coordinates of each geometric beacon observed and an associated credibility value, which value can be increased or decreased as a geometric beacon is observed or not observed at the corresponding coordinates in subsequent traversals by the robot of the environment.

5. A method for use by a robot in navigating a limited environment comprising the steps of scanning repeatedly the environment as the robot moves therealong for reflecting surfaces that can be used as observed geometric beacons and ascertaining their coordinates relative to a reference origin position, scanning the coordinates of said observed beacons in a storage medium as map features and associating with each feature a credibility value that can be increased or decreased, on each scan using the features previously stored for predicting the locations of geometric beacons that should be observed in such scan, matching such predictions with the locations of geometric beacons observed in the scan, when there is a match, increasing the credibility value of any feature matched to the location of a beacon observed in the scan, when there is no match decreasing the credibility value of any feature representing a beacon not matched with a predicted beacon at its location, and determining the position of the robot in the environment by reference to its position relative to beacons then being observed corresponding to map features of highest credibility values.

6. The method of claim 5 in which the scanning utilizes ultrasonic energy.

7. The method of claim 5 in which the scanning utilizes electromagnetic energy chosen from microwave, infra-red and visible light.

* * * * *